United States Patent

[11] 3,634,172

[72] Inventors Wesley M. Fujii
Menlo Park;
George D. Rehklau, Los Altos, both of Calif.

[21] Appl. No. 872,805
[22] Filed Oct. 31, 1969
[45] Patented Jan. 11, 1972
[73] Assignee Electro Sound, Inc.
Sunnyvale, Calif.

[54] APPARATUS FOR HOLDING TWO ABUTTING TAPE ENDS IN PLACE AND APPLYING A SEGMENT OF SPLICING MATERIAL ACROSS THEIR JUNCTION
8 Claims, 7 Drawing Figs.

[52] U.S. Cl. .......... 156/506, 156/502, 156/514
[51] Int. Cl. .......... B31f 5/06, B65h 69/06, G03d 15/04
[50] Field of Search .......... 156/502, 505, 506, 513, 514, 521, 518

[56] References Cited

UNITED STATES PATENTS

| | | | |
|---|---|---|---|
| 2,475,351 | 7/1949 | Castay | 156/506 |
| 3,081,815 | 3/1963 | Toensing | 156/521 |
| 3,162,565 | 12/1964 | Miller et al. | 156/506 |

*Primary Examiner*—Benjamin A. Borchelt
*Assistant Examiner*—J. J. Devitt
*Attorney*—Lawhurst & Hamrick

ABSTRACT: A tape-splicing apparatus comprising, a base including a splicer block for receiving and holding in end-abutting relationship two tape ends to be spliced together, a splicing material dispenser pivotally mounted to the base and rotatable between a rest position and a dispensing position and including a punch and die for severing a splicing segment from a length of adhesive-coated splicing material and depositing it across the tape ends, and a roller operatively associated with the dispenser and operative to press the splicing segment into bonding engagement with the tape ends as the dispenser is rotated from the dispensing position back into the rest position.

INVENTORS
WESLEY M. FUJII
GEORGE D. REHKLAU
BY
Harvey J. Lowbeer [signature]
ATTORNEY INVENTORS
WESLEY M. FUJII
GEORGE D. REHKLAU
BY
[signature]
ATTORNEY

APPARATUS FOR HOLDING TWO ABUTTING TAPE ENDS IN PLACE AND APPLYING A SEGMENT OF SPLICING MATERIAL ACROSS THEIR JUNCTION

BACKGROUND OF THE INVENTION

The present invention relates generally to tape-splicing apparatus and, more particularly, to a novel tape-splicing device having particular applicability to the splicing of magnetic tapes during the process in which the tapes are packaged in cassettes, cartridges, and the like.

With the recent rise in the popularity of cassette- and cartridge-type tape players, one of the problems which has confronted the magnetic tape industry has been the time required to load a prerecorded strip of magnetic tape into the cassette or cartridge housing. In accordance with the prior art loading method in which the prerecorded strip is loaded into preleadered cassettes, an operator is required at each winding station to manually cut the leader, place one cut in a leader-holding device, then appropriately trim one end of a length of magnetic tape to match the cut end of the leader. In some assembly methods, however, the preleadered cassette leaders are already cut and the tape ends are automatically cut by the winding apparatus to match the precut leaders. In either case, the two ends are thereafter abutted together and a suitable length of splicing tape is cut and aligned with the aligned ends. The splicing tape is then firmly pressed over the lead and magnetic tape ends by hand to complete the splice.

In the normal operation, a skilled employee is able to perform such a splicing operation in approximately 20 seconds. However, it has been found that because of the tedium involved in the splicing operation, it becomes more difficult to properly align the three elements required to perform the splice as the working day progresses, and as a result either the quality of the splice begins to suffer or the time required to make the splice becomes extended.

The effect of a poor quality splice is quite material to the fabrication process since, if the splice is not properly performed, it may cause the tape to become separated from the leader in which case the cassette would be completely unusable, or if the splicing tape is misaligned so that the adhesive side is left partially exposed, this may cause any of the various parts of the recorder which come in contact with the tape to become gummed or even damaged by abrasive particles which may be picked up by the adhesive and carried across the operative parts of the recording-playback apparatus.

Another important splicing defect which has accounted for a large percentage of manufacturing rejects and consumer product returns is where the tape ends were not properly aligned when the splice was made. In such a case, the tape is caused to wind about the reel in a slightly helical manner rather than in the intended flat spiral about the reel. Consequently, as the tape is wound one edge is caused to bind on the side of the cassette or cartridge so as to impart enough drag on the tape to effect the drive speed or even stop the tape completely.

OBJECTS OF THE INVENTION

It is therefore a primary object of the present invention to provide a novel splicing apparatus which makes it possible to consistently perform a uniform splice independent of operator fatigue.

Another object of the present invention is to provide a novel splicing apparatus which requires a single mechanical movement to precisely cut and apply a length of splicing material across two abutted ends of tape to be spliced together.

Still another object of the present invention is to provide a novel tape-splicing apparatus for sequentially cutting a precisely defined segment of splicing material, accurately applying it to the two matched tape ends to be spliced together and then applying pressure across the splice to perform the required bond, all of these steps being accomplished in response to a single operator arm movement or electric switch actuation.

SUMMARY OF THE PRESENT INVENTION

In accordance with the present invention, a novel splicing apparatus is provided which comprises a splicer block for aligning and holding in place the tape end to be spliced together, a splicing material dispensing means for providing a precision cut segment of splicing material and disposing it in registry with the tape ends to be spliced together, and pressure-applying means for securely bonding the segment to the tape ends. After the tape ends have been cut and properly positioned on the splicer block, the splice is accomplished by a simple rotation of the dispensing means into its dispensing position. This rotation can be accomplished either manually or electrically. Following rotation into the dispensing position the dispensing means is allowed to return to its rest position during which time a roller passes over the splice applying pressure thereto to complete the splicing operation.

Whereas the prior art method of splicing required a minimum of 20 seconds per splice, the same operation can be accomplished in less than 5 seconds using the present invention. Moreover, notwithstanding the increase in fabricating speed, a precision splice can be accomplished each time with little dependence on the manual dexterity or degree of fatigue of the operator.

The many advantages of the present invention will become apparent to those skilled in the art after having read the following detailed disclosure of a preferred embodiment which is illustrated in the several figures of the drawing.

IN THE DRAWING

DESCRIPTION OF THE PREFERRED EMBODIMENTS

Figures 1, 2:
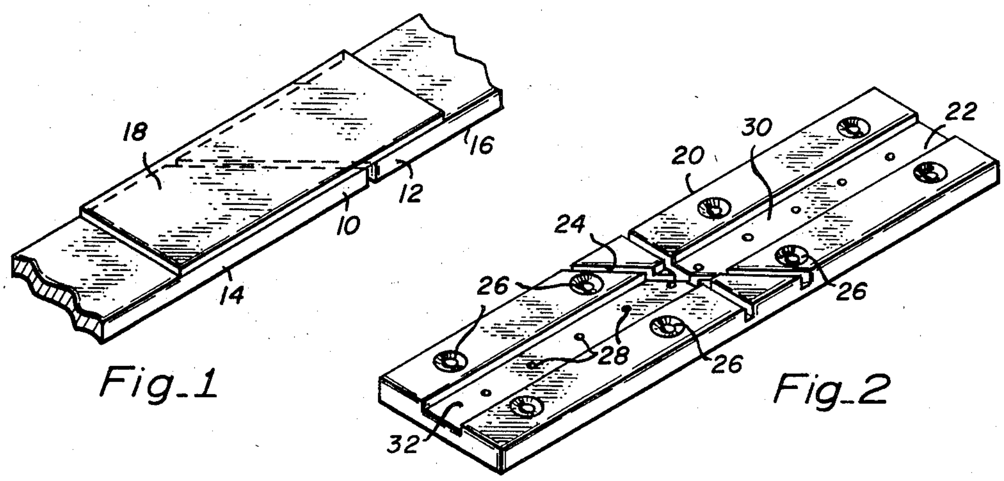
FIG. 1 is an illustration showing the way in which two ends of magnetic tape are typically spliced together.
FIG. 2 is an illustration of a splicing block in accordance with the present invention.

Referring now to FIG. 1 of the drawing, there is shown a completed splice of the type which may be obtained utilizing the present invention. The splice is performed by aligning the two ends 10 and 12 of the lengths of tape 14 and 16, and then pressing a length of splicing material 18, having a suitable adhesive on the lower side thereof, into engagement with the two tape ends so as to splice them together. The flexible and tensile qualities of the splicing material 18 should be at least as good as those of the tapes 14 and 16 so as to insure that the splice will endure the useful lifetime of the lengths of tape which are thereby spliced together.

In FIG. 2 of the drawing, a splicer block in accordance with the present invention is illustrated which includes an elongated rectangular block of a suitable rigid material 20 having a slot 22 cut longitudinally along its upper surface. The width of the slot 22 is determined by the width of the tape to be placed therein for splicing and should be just wide enough to receive the tape. The depth of the slot 22 is determined by the thickness of the tape. Also cut into the upper surface of the block 20 are one or more transverse and/or diagonal grooves 24 having depths slightly deeper than the slot 22 and widths large enough to accommodate a razor blade or other tape-cutting tool.

Passing through the block 20 are a plurality of holes 26 and 28 which are located as indicated in the drawing. The holes 26 are for use in mounting the block 20 to the splicer apparatus, to be disclosed in detail below, and the holes 28 provide passages to a vacuum manifold over which the block 20 is mounted. By reducing the pressure in the manifold, lengths of tape placed within the slot 22 will be held therein by the suction created at the holes 28.

In use, one end of the tape to be spliced is positioned in the rightmost half 30 of the slot 22 so as to overlap one of the grooves 24 and a razor or other cutting implement is drawn through the appropriate groove 24 to trim the end of that piece of tape. The trimmed away portion is then removed and the end of the second section of tape to be spliced is positioned in the leftmost portion 32 of the slot 22 so as to slightly overlap the groove 24. This end is likewise trimmed by cutting through the chosen slot 24 and the waste material is removed. Precut tape and leader would merely be positioned so as to abut at the groove 24. With the two tape ends so positioned and held in place by the suctions created at the holes 28, a segment of splicing material may be positioned over the two ends to perform a splice of the type indicated in FIG. 1. The spliced tape can then easily be stripped from the slot 22 since the negative pressure used to hold the tape in place is small.

Figures 3, 4, 7:
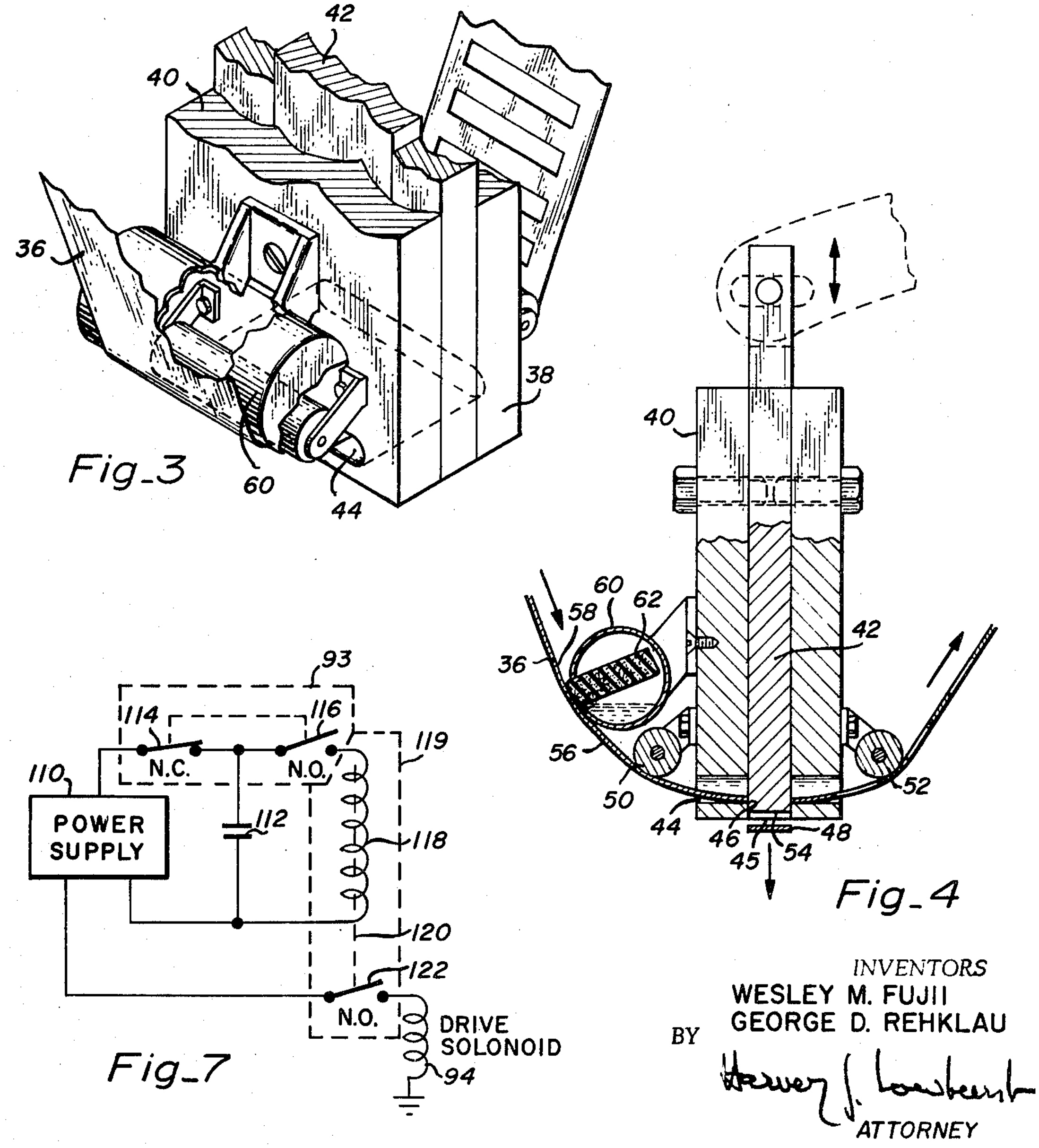
FIG. 3 is a broken perspective view of a splicing material punching assembly in accordance with the present invention.
FIG. 4 is a transverse cross section taken across the punch assembly illustrated in FIG. 3.
FIG. 7 is a simplified diagram of a preferred form of the electrical actuating circuitry of the present invention.

Turning now to FIG. 3 of the drawing, there is shown a splicing material severing or punching apparatus 38 in accordance with the present invention which is used to punch out precisely dimensioned segments of splicing material from a strip of adhesive-backed material 36 which may be formed of mylar, metallized mylar or any other suitable composition. The punching apparatus 38 consists of a housing 40 with a punch 42 passing therethrough. As shown in FIGS. 3 and 4, a transverse passageway 44 is provided through the lower portion of the housing 40 so that the strip of adhesive-backed material 36 may be passed therethrough. The inside edges 46 of the housing 40 thus serve as a die which cooperates with the punch 42 to shear rectangular splicing segments 48 from the strip 36 and eject them out of the bottom opening 45. These segments are then used to perform the splice as will be explained below.

A pair of rollers 50 and 52 are provided on either side of the passageway 44 so as to guide the strip 36 along the approximate center line of the passageway 44. Because of the close tolerances required between the die edge 46 and the cutting edge 52 of the punch 42, and the fact that the lower surface 56 of the strip 36 is coated with an adhesive, it is necessary to provide some means for preventing small amounts of the adhesive from sticking to either the cutting edge 46 or the sides of the punch 42 and thereby causing excessive friction between the two relatively moving parts. In order to prevent the adhesive from sticking to either of these parts, a lubricant having a very low viscosity is applied to the upper side 58 of the strip 36 by a lubricant applicator 60 mounted as illustrated.

A simple lubricant applicator may be comprised of a cylindrical reservoir having an elongated wick 62 extending thereinto to draw the lubricant out of the reservoir and apply it to the material 36. The wick, however, must be chosen so as to apply only a small amount of lubricant to the back side 58 of the material 36 since any lubricant on the adhesive side will prevent the adhesive from sticking to an intended tape surface. The applicator 60 is mounted to the punch housing 40 and is positioned so that the strip 36 is drawn across the wick 62 before passing through the stamping aperture 44. Because of the very thin coating of lubricant applied to the upper side of the strip 36, a small amount of this lubricant will be picked up by the cutting edge 54 of punch 42 and transferred to the die edge 46 as it passes therethrough so as to prevent any of the adhesive material from sticking thereto as the segment 48 is stamped out and separated from the strip 36. In order to prevent sticking before the lubricated material reaches the die, the punching apparatus should be lightly lubricated before the strip 36 is threaded into the device.

Figures 5, 6:
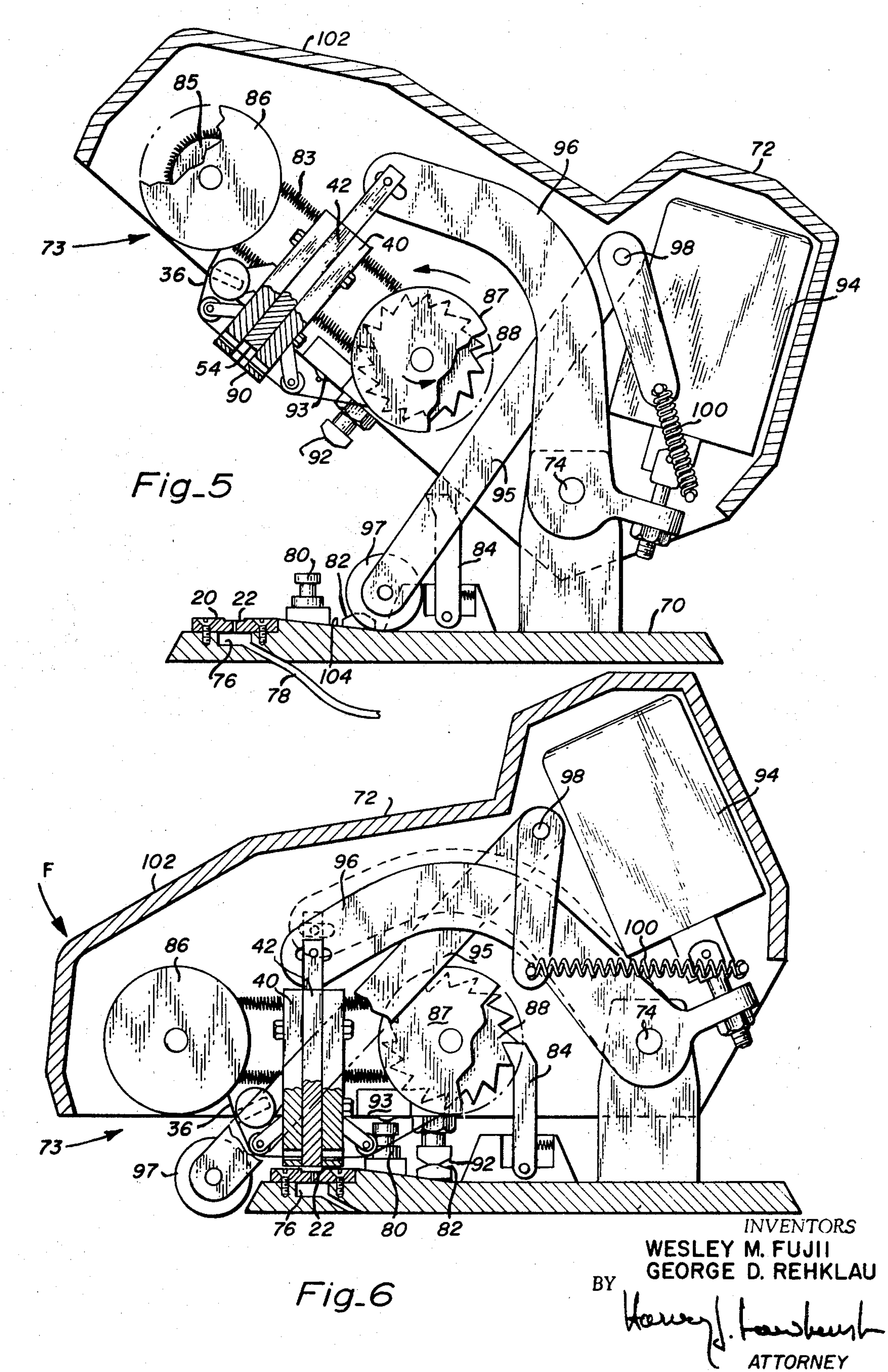
FIG. 5 is a cross section taken through a preferred embodiment of a tape-splicing apparatus in accordance with the present invention.
FIG. 6 is a cross section taken through the tape splicer of the present invention showing the device rotated into the splicing position.

Turning now to FIG. 5 of the drawing, a preferred embodiment of a splicing device in accordance with the present invention is illustrated in its rest position. The device includes a base 70 to which, a housing 72, for enclosing the operative components of the splicing material's dispensing means 73, is pivotally mounted to rotate about the axis 74. Also mounted to the base 70 is the splicing block 20 which is positioned over the manifold 76. The manifold 76 is partially evacuated by a suitable vacuum pump via the tube 78. Although not illustrated in detail in the drawing, it should be pointed out that where a small capacity vacuum pump is to be utilized it may be desirable to divide the manifold 76 into two chambers, one for either side of the splicing block 20, and to provide some type of flow-regulating device so that a sufficient pressure reduction can be obtained in either manifold chamber even though the holes 28 in the other side of the block 20 are not covered by tape. Moreover, two separate manifold chambers may be provided with each having its own vacuum source. The purpose of such provision is to allow one tape end to be held in place in slot 22 while the other is being positioned.

Additionally mounted to the upper surface of the base 70 is an adjustable microswitch triggering pedestal 80, a hard stop means 82, and a pawl 84. Mounted within the housing 72 is a supply reel 86 for containing the adhesive-backed splicing material 36, and a takeup reel 87 which is positioned on the opposite side of the punching mechanism 40. The takeup reel 87 includes a ratchet wheel 88 which engages the pawl 84 to advance the strip 36 by a predetermined amount each time the housing 72 is rotated into its dispensing position as illustrated in FIG. 6. In order to maintain tension on the strip 36, a drag tensioning means is utilized which consists of a spring belt 83 looped over a pair of pulleys 85 affixed to each of the reels 86 and 87. The frictional slippage between the belt 83 and the oppositely turning pulleys thus determines the tension on the strip 36.

The punch assembly 38 is mounted within the housing 72 so that the lower end 90 is carried into close proximity and precision alignment with the splicing block 20 as the housing 72 is rotated downwardly. It is, however, prevented from striking the splicing block 20 by an adjustable hard stop means 92 which engages the lower hard stop 82 so as to cause a predetermined spacing to be maintained between the lower side 90 of the punch housing 40 and the upper surface of the splicing block 20. This spacing is determined by the lowermost projection of the punch 42 when actuated, so as to prevent the punching edge 54 thereof from striking the block 20 and causing either damage thereto or unintentional injury to the tape being spliced.

The punch assembly 38 is actuated by a solenoid 94 mounted in the rear part of the housing 72. The solenoid 94 drives the punch 42 via a connecting arm 96 which is pivotally mounted about the axis 74. The solenoid 94 is a fast-acting mechanism having a strong spring return means so as to cause the punch 42 to be quickly withdrawn from the die 46 immediately after having passed therethrough cutting away a segment of material 36. A microswitch 93 is mounted to the lower side of the housing 72 so as to engage the pedestal 80 slightly before the stop 92 engages the stop 82. The microswitch 93 causes the solenoid 94 to be energized, as explained below with reference to FIG. 7, so as to rotate the drive arm 96 counterclockwise driving the punch 42 downwardly to stamp out a segment from the material 36 and deposit it over the tape ends positioned in the slot 22 of the splicing block 20.

Also pivotally mounted within the housing 72 is a roller means 95 which is biased to rotate about the axis 98 by a spring means 100 so as to serve the tripartite function of (1) rolling over the cut ends of tape disposed in the slot 22 as the housing 72 is rotated downwardly so as to insure that they are pressed flat for receiving the splicing material, (2) biasing he housing 72 in the counterclockwise direction about point 74 so as to cause the housing 72 to rotate back into the position illustrated in FIG. 5 when the actuating force F is released, and (3) to apply a suitable bonding pressure to the upper side of the splice as it rolls back over the slot 22 to insure a good adhesive bond is obtained.

In FIG. 7 of the drawing, a simplified diagram of the solenoid actuation circuitry for causing rapid operation of the drive solenoid 94 is shown. This circuit includes a power supply means 110 which is coupled across a storage capacitor 112 by a normally closed switch 114 forming a part of the microswitch 93. Microswitch 93 also includes a normally open switch 166 which when closed couples the relay winding 118 of relay 119 across capacitor 112. The armature 120 of the relay 119 drives a normally open relay switch 122 which when closed couples an output power supply 110 to the drive solenoid 94. The relay 119 is of the high-current fast-acting type which requires a strong pulse of current to cause it to close the switch 122. This current impulse is obtained from the capacitor 112 when microswitch 93 is actuated. It will be noted that the switches 114 and 116 are ganged together so that actuation of the microswitch 93 causes switch 114 to open simultaneously with the closing of switch 116 so as to isolate the power supply 110 from the strong surge or current which is passed through the relay winding 118 when switch 116 is closed.

In operation, dispensing means 73 is normally biased into the rest position illustrated in FIG. 5 by the spring means 100. After an operator has properly trimmed the two ends of tape to be spliced and positioned them in the slot 22 of the block 20, the operator grasps the housing at 102 applying a downward force thereto sufficient to cause the housing 72 to rotate about the axis 74 into the dispensing position illustrated in FIG. 6. As the housing 72 rotates downwardly, the roller 97 rolls up the ramp 104 and across the splicing block 20 to insure that the tape ends are firmly pressed into the slot 22.

As the microswitch 93 engages the pedestal 80 and the rotation of the housing 72 is terminated by the hard stop 92 engaging stop 82, a pulse of energy is supplied to the solenoid 94 causing the arm 96 to be driven counterclockwise about axis 74 into the position illustrated in FIG. 6 so as to drive the punch 42 through the material 36. At the end of the punching stroke the cut segment is deposited onto the tape ends held in slot 22 by the vacuum applied to manifold 76.

Since the solenoid operation occurs substantially simultaneously with the striking of the stop means 92 and 82, the actuating force applied to the housing 72 can be released by the operator immediately after the stops make contact so as to allow dispensing means 73 to return to its rest position as indicated in FIG. 5. As it does so, the roller 97 rolls back over the spliced tape end applying a firm rolling pressure to the top of the splicing material to insure that the material is securely bonded to the tape ends. The spliced tape may then be removed from the block 20 and the operation repeated.

In accordance with the present invention, a splicing device has been disclosed which enables a segment of splicing material to be precisely applied to two properly aligned tape ends with consistent accuracy and even application of bonding pressure. Once the two ends of the tape to be spliced are properly positioned, there is no chance that the splice will be malformed due to inattentiveness or fatigue on the part of the operator. Moreover, the time required to apply the splice is negligible as compared with the time previously required to cut a segment of splicing material from a roll, manually position it over the tape ends placed in a splicing block and then apply finger pressure thereto to cause it to adhere to the two ends of the tape.

Although the actuation of the splicing device of the preferred embodiment described above is accomplished manually, it is to be understood that an electrical or pneumatic drive means actuated by a foot pedal, or the like, could just as well be incorporated into the apparatus so as to eliminate the necessity of the operator raising his hand to depress the housing 72.

Although it is contemplated that many modifications to the present invention will become apparent to those skilled in the art after having read the foregoing disclosure, it is to be understood that this description is for purposes of illustration only and is in no way intended to be limiting. Accordingly, it is intended that the appended claims be interpreted as covering all modifications which fall within the true spirit and scope of the invention.

What is claimed is:

1. Apparatus for splicing together two tape ends, comprising:
   - base means including means for receiving said two ends and holding them in abutting relationship;
   - splicing material dispensing means pivotally mounted to said base means and rotatable between a rest position and a splicing position, said dispensing means including severing means responsive to rotation of said dispensing means into said splicing position and operative to sever a splicing segment from a length of adhesive-coated splicing material carried by said dispensing means during said rotation and to deposit said segment across said two ends; and
   - pressure-applying means operatively associated with said dispensing means and operative to press said segment into bonding engagement with said two ends as said dispensing means is rotated from said splicing position back into said rest position.

2. Apparatus as recited in claim 1 wherein said severing means includes a punch and die, and means for applying lubrication to said splicing material prior to its engagement by said punch and die.

3. Apparatus as recited in claim 1 wherein said means for receiving and holding said two ends includes, a splicer block having a slot formed in the upper surface thereof, said slot having a width and depth substantially equivalent to the width and thickness, respectively, of the tapes whose ends are to be spliced together, said block having openings therein providing passages intersecting the bottom of said slot and through which a partial vacuum can be drawn to provide suction for holding said two ends in place in said slot.

4. Apparatus for splicing together two tape ends, comprising:
   - base means including means for receiving and holding said two ends in abutting relationship;
   - splicing material dispensing means pivotally attached to said base means and rotatable between a rest position and a splicing position, said dispensing means including, severing means, means for positioning splicing material in operative relationship with said severing means, and actuating means responsive to rotation of said dispensing means into said splicing position and operative to cause said severing means to sever a splicing segment from the splicing material and dispose it upon said two ends; and
   - pressure-applying means responsive to rotation of said dispensing means from said splicing position to said rest position and operative to apply bonding pressure to said segment, said pressure-applying means including, an arm pivotally attached to said dispensing means at one end and having a roller affixed to the other end for rollingly engaging said segment, and means for resiliently biasing said arm in a direction tending to rotate said dispenser means into said rest position.

5. Apparatus as recited in claim 4 wherein said severing means includes a punch and die, and means for applying lubrication to the splicing material prior to its engagement by said punch and die.

6. Apparatus as recited in claim 4 wherein said means for positioning splicing material includes a supply reel and a takeup reel for transporting a strip of the splicing material, and means responsive to rotation of said dispensing means for advancing said strip from said supply reel to said takeup reel.

7. Apparatus as recited in claim 4 wherein said means for receiving and holding said two ends includes, a splicer block having a slot formed in the upper surface thereof, said slot having a width and depth substantially equivalent to the width and thickness, respectively, of the tapes whose ends are to be spliced together, said block having openings therein providing passages intersecting the bottom of said slot and through which a partial vacuum can be drawn to provide a suction for holding said two ends in place in said slot.

8. In a tape-splicing apparatus of the type described having means for severing a segment of splicing material from a strip of adhesive-backed splicing material and applying it across two abutted ends of tape to be spliced together, an improved severing means, comprising:

punch housing means having a punchway for receiving a punch;

a punch having a cross-sectional configuration dimensioned in accordance with the dimensions of the segment of material to be severed thereby;

a passageway passing transversely through the lower portion of said punch housing in intersecting relationship with said punchway, and through which a strip of adhesive-coated material to be punched is passed, the lower edge of said passageway and said punchway forming a die which cooperates with said punch to enable a splicing segment of material to be severed from said strip; and a lubricating means for applying a thin layer of lubricant to a nonadhesive coated side of said strip before it is passed through said passageway, whereby a small amount of said lubricant is picked up by said punch and transferred to said die to prevent adhesive from being transferred from said strip to said die and said punch.

* * * * *